US005455214A

United States Patent [19]
Furtek et al.

[11] Patent Number: 5,455,214
[45] Date of Patent: Oct. 3, 1995

[54] METALLOCENES SUPPORTED ON ION EXCHANGE RESINS

[75] Inventors: Allan B. Furtek, Warren; Michael J. Krause, East Brunswick, both of N.J.

[73] Assignee: Mobil Oil Corporation, Fairfax, Va.

[21] Appl. No.: 118,338

[22] Filed: Sep. 9, 1993

[51] Int. Cl.$^6$ ...................................................... B01J 31/00
[52] U.S. Cl. ........................ 502/109; 502/103; 502/117; 502/152; 502/159; 526/90
[58] Field of Search ................................... 502/103, 117, 502/152, 159, 109

[56] References Cited

U.S. PATENT DOCUMENTS

4,111,856  9/1978  Haag et al. .............................. 502/159

OTHER PUBLICATIONS

Jordan, Richard F., et al., "Chemistry of Cationic Zirconium(IV) Benzyl Complexes. One–Electron Oxidation of d Organometallics." J. Am. Chem. Soc., 1987, 4111–4113 no month available.
Yang, Xinmin, "Cation–like Homogeneous Olefin Polymerization Catalysts Based upon Zirconocene Alkyls and Tris(pentafluorophenyl)borane", J. Am. Chem. Soc., 1991, 3623–3625 no month available.
Chien, James C. W., "Isospecific Polymerization of Propylene Catalyzed by rac–Ethylenebis(indenyl)methylzirconium Cation", J. Am. Chem. Soc., 1991, 8570–8571.

*Primary Examiner*—Anthony McFarlane
*Assistant Examiner*—E. D. Irzinski
*Attorney, Agent, or Firm*—Alexander J. McKillop; Malcolm D. Keen; Marina V. Schneller

[57]  ABSTRACT

A catalyst precursor composition comprises the reaction product of a cation exchange resin containing trityl carbonium ions contacted with a metallocene. The process of producing the reaction product of a cation exchange resin containing trityl carbonium ions contacted with a metallocene comprises (1) providing a cation exchange resin which has cations,
(2) contacting the cation exchange resin with a solution comprising a trityl halide complex and solvent therefor to form an intermediate; and
(3) contacting the intermediate with a metallocene, preferably a zirconocene salt.

The resulting composition can be used to form ethylene resins in an alumoxane free system.

21 Claims, No Drawings

METALLOCENES SUPPORTED ON ION EXCHANGE RESINS

FIELD OF THE INVENTION

The invention relates to catalyst compositions for olefin polymerization comprising transition metal compounds or salts thereof supported on modified ion exchange resins. When prepared under the conditions described below, the transition metal compound or salt supported on an ion exchange resin is an efficaceous catalyst precursor. This precursor, in combination with a cocatalyst, acts as an olefin polymerization catalyst of good activity. The catalyst composition of this invention comprises a metallocene polymer supported product which does not require activation with aluminoxane. Accordingly, the invention relates to catalytic olefin polymerization and copolymerization, of good productivity. It relates to the production of high molecular weight olefin polymers of narrow molecular weight distribution containing more than 60 percent of ethylene units.

BACKGROUND OF THE INVENTION

Low pressure or linear polyethylene is produced commercially using either Ziegler-Natta or supported chromium catalysts. These catalysts have high activities, and produce a variety of homopolymers and copolymers of ethylene and alpha olefins. When making copolymers, these catalysts typically produce resins of moderately broad to very broad molecular weight distribution.

Ziegler-Natta and supported chromium catalysts produce copolymers of ethylene and alpha olefins of non-uniform branching distribution. The alpha olefins are preferentially incorporated into the lower molecular weight portions of the copolymer. This non-uniform incorporation affects polymer properties. At a given polymer density, higher comonomer percent incorporation is required and a higher polymer melting point is seen. For example, ethylene/1-hexene copolymers of 1.0 $I_2$ and 0.918 gm/cc density produced by a typical Ziegler-Natta catalyst will contain 3.0 to 3.5 mole percent 1-hexene and have melting points of 126° to 127° C.

Recently, a new type of olefin polymerization catalyst has been described. These catalysts are metallocene derivatives of transition metals, typically group IV transition metals such as zirconium, of the empirical formula $CP_mMA_nB_p$. These compounds are activated with methylaluminoxane (MAO) and produce olefin polymers and copolymers, such as ethylene and propylene homopolymers, and ethylene/butene and ethylene/hexene copolymers. These are described in Kaminsky et al, U.S. Pat. No. 4,542,199 and Sinn et al, U.S. Pat. No. 4,404,344; the entire contents of both are incorporated herein by reference.

Compared to earlier Ziegler-Natta catalysts, zirconocene/MAO catalysts produce polyethylene resins of relatively narrow molecular weight distribution and a highly homogeneous branching distribution. Ethylene/1-hexene copolymers of 1.0 $I_2$ and 0.918 gm/cc density produced by these catalysts usually contain 2.5 mole percent 1-hexene and have melting points of 114° to 115° C. These resins can be used to make films of significantly higher impact strength and better clarity than those of resins prepared with standard Ziegler-Natta catalysts.

A new series of reactions have been described in which dialkylzirconocenes ($Cp_2ZrRR'$ where R and R' are straight chain hydrocarbon groups) are activated without aluminoxane to produce a catalytically active transition metal cation. Jordan et al, *J. Amer Chem Soc.* 1987, 109, 4111 has reacted $Cp_2ZrMe_2$ with $(Cp_2Fe)_+B(C_6H_5)_4-$ in $CH_3CN$ to produce $Cp_2ZrMe(CH_3CN)+B(C_6H_5)_4-$. This ionic complex has rather poor activity for olefin polymerization due to the coordinated solvent molecule.

Common anions, such as $B(C_6H_5)_4$, react with the zirconocene cation in the absence of a coordinating solvent. These reactions produce products that are not effective olefin polymerization catalysts.

Stable, solvent-free, zirconocene cations have been produced by Chien et al, *J. Amer. Chem. Soc.* 1991, 113, 8570. Reacting $Cp_2ZrMe_2$ with $Ph_3C^+B(C_6F_5)_4^-$ in a non-coordinating solvent produces $Cp_2ZrMe^+B(C_6F_5)_4$. Likewise, Marks et al, *J. Amer. Chem. Soc.* 1991, 113, 3623, react $Cp^*_2ThMe_2$ with $B(C_6F_5)_3$ in a non-coordinating solvent to produce $CP_2ThM^+MeB(C_6F_5)_3$. These ionic complexes are highly active olefin polymerization catalysts.

SUMMARY OF THE INVENTION

Surprisingly, we have found that a modified ion exchange resin can be used to generate the active metallocene cation. The resin serves both as a non reactive anion and as a catalyst support. This invention comprises the reaction product of a modified ion exchange resin and a metallocene to produce an olefin polymerization catalyst. A specific composition of the invention is the product of a cation exchange resin containing trityl carbonium ions with a metallocene.

The process of producing the specific catalyst comprises reacting together (1) a cation exchange resin,
(2) a trityl halide solution of sufficient concentration to replace all the acidic or cationic sites with trityl, and
(3) a metallocene, preferably a zirconocene salt in solvent, in a ratio of 0.01 to 1 mmol Zr per gram of exchange resin.

Another catalyst of the invention comprises a cocatalyst and the product of a cation exchange resin containing trityl carbonium ions contacted with a metallocene. The invention also includes an olefin polymerization process of good productivity employing the catalysts of the invention.

DETAILED DESCRIPTION OF THE INVENTION

The most preferred compositions of the invention act as high activity catalysts for homopolymerization of ethylene and copolymerization of ethylene and an alpha olefin to produce high molecular weight products containing at least, or more than, 60 percent of ethylene units, with an MFR value from 15 to 25. The catalysts of the invention are free of aluminoxane and use a cocatalyst comprising an aluminum alkyl compound, in which each alkyl contains 1 to 8 carbon atoms and a catalyst precursor comprising a metallocene supported on an ion exchange resin. The invention will be illustrated by the methods of preparing these compositions.

Ion exchange materials are sold as granules or spheres. The majority is prepared and sold in spherical (bead) form, from about 10 microns to 1.2 mm (up to 16 mesh) in diameter. Particle size and porosity are controlled by polymerization conditions; the preferred substrates are organic, resin materials. Conventional ion-exchange materials contain ion-active sites throughout their structure with a uniform distribution of activity, as a first approximation. Cf. KIRK OTHMER, ENCYCLOPEDIA OF CHEMICAL TECHNOLOGY, Vol. 13 p 168 (Third Edition.) The preferred ion exchange material is a cation exchange material. The cationic portion is generally a cation of an alkali or an alkali earth metal. The anionic portion e.g., anionic sites, of the resin material preferably contains sulfonate groups. Most preferably, the ion exchange material is a sulfonated copolymer of styrene and divinylbenzene. The ion exchange capacity of the cation exchange material ranges from 3 to 11 meq/gm.

The ion exchange material is in the form of porous particles, and is provided in the form of distinct particulate material. The distinct particulate material, in addition to being an essential component of catalyst synthesis as elucidated below, may also be a carrier or support with the attendant benefits that use of a support provides. In this respect, the use of the porous, crosslinked polymer particles as a catalyst support is distinct from the use of the polymeric materials as supports in prior art for olefin polymerization catalyst compositions.

The polymer particles of the ion exchange material have spherical shape with particle diameter of about 1 to about 300 microns, preferably about 10 to about 150 microns and most preferably about 10 to about 110 microns. The particles are preferably chemically inert with respect to water, oxygen, organic solvents, organometallic compounds and halides of transition metals and are free flowing powders. They are preferably crosslinked by any conventional means, such as by cross linking agents, e.g., divinylbenzene, paravinylstyrene, para-methylstyrene and trimethylacrylate under conventional crosslinking conditions, or by electromagnetic radiation in a conventional manner, e.g., see KIRK-OTHMER ENCYCLOPEDIA OF CHEMICAL TECHNOLOGY, Third Edition, Volumen 19, pages 607–624, John Wiley & Sons, New York (1982).

The polymer particles may be manufactured from any suitable polymers, including thermoplastic, thermoset semicrystalline, amorphous, linear, branched or cross-linked polymers. Examples of suitable polymer used to manufacture the porous particles are polyethylene, polystyrene, poly(vinyl alcohol), poly(methyl methacrylate), or poly(methylacrylate). The preferred carrier is a crosslinked polystyrene polymer. More preferably, the carrier is polystyrene crosslinked with divinylbenzene. The most preferred polymer particles are cross-linked polystyrene copolymers from Rohm & Haas Corp. under the tradename of Amberlite or Amberlyst.

In a preferred embodiment the ion exchange material is contacted with a trityl halide, e.g. chloride. This contact results in displacement of the alkali or alkali earth metal cation of the ion exchange resin. The amount of trityl chloride is based on the ion exchange capacity and ranges from 3 to 11 meq/gm, preferably 3 to 5 meq/gm. The contact results in ion exchange reaction between the ion exchange material and the tritylchloride is undertaken at a temperature ranging from 0° to 100° C., preferably 20° to 30° C., under air-free, water-free conditions.

The tritylchloride treated ion exchange resin is then contacted with a metallocene to form a catalyst precursor. The amount of the metallocene can range from 0.01 to 1.0 mmol/g, preferably from 0.05 to 0.30 mmol/g. Contact, and ion exchange with the trityl compound can be undertaken at a temperature ranging from 0° to 100° C., preferably 20° to 30° C., under air-free, water-free conditions.

In a preferred embodiment the trityl treated ionexchange resin is contacted with a metallocene. The metallocene salt or compound has the formula $Cp_mMA_nB_p$ in which Cp is an unsubstituted or substituted cyclopentadienyl group, M is zirconium or hafnium and A and B belong to the group including a halogen atom, hydroxide, alkoxide, hydrogen or an alkyl group. In the above formula of the metallocene compound, the preferred transition metal atom M is zirconium. Preferably, m is 2 but it may also be 1; and m+n+p equals the valence of M. In the above formula of the metallocene compound, the Cp group is an unsubstituted, a mono- or a polysubstituted cyclopentadienyl group. The substituents on the cyclopentadienyl group can be preferably straight-chain $C_1$–$C_6$ alkyl groups. The cyclopentadienyl group can be also a part of a bicyclic or a tricyclic moiety such as indenyl, tetrahydroindenyl, fluorenyl or a partially hydrogenated fluorenyl group, as well as a part of a substituted bicyclic or tricyclic moiety. In the case when m in the above formula of the metallocene compound is equal to 2, the cyclopentadienyl groups can be also bridged by polymethylene or dialkylsilane groups, such as —$CH_2$—, —$CH_2$— $CH_2$—, —CR'R"— and —CR'R"—CR'R"— where R' and R" are short alkyl groups or hydrogen, —Si($CH_3$)$_2$—, Si($CH_3$)$_2$—$CH_2$—$CH_2$Si($CH_3$)$_2$— and similar bridge groups. If the A and B substituents in the above formula of the metallocene compound are halogen atoms, they belong to the group of fluorine, chlorine, bromine or iodine. If the substituents A and B in the above formula of the metallocene compound are alkyl groups, they are preferably straight-chain or branched $C_1$—$C_8$ alkyl groups, such as methyl, ethyl, n-propyl, isopropyl, n-butyl, isobutyl, n-pentyl, n-hexyl or n-octyl.

Suitable metallocene compounds include bis(cyclopentadienyl)metal dihalides, bis(cyclopentadienyl)metal hydridohalides, bis(cyclopentadienyl)metal monoalkyl monohalides, bis(cyclopentadienyl)metal dialkyls and bis(indenyl)metal dihalides wherein the metal is zirconium or hafnium, halide groups are preferably chlorine and the alkyl groups are $C_1$–$C_6$ alkyls. Illustrative, but non-limiting examples of metallocenes include bis(cyclopentadienyl)zirconium dichloride, bis(cyclopentadienyl)hafnium dichloride, bis(cyclopentadienyl)zirconium dimethyl, bis(cyclopentadienyl)hafnium dimethyl, bis(cyclopentadienyl)zirconium hydridochloride, bis(cyclopentadienyl)hafnium hydridochloride, bis(pentamethylcyclopentadienyl)zirconium dichloride, bis(pentamethylcyclopentadienyl)hafnium dichloride, bis(n-butylcyclopentadienyl)zirconium dichloride, cyclopentadienyl-zirconium trichloride, bis(indenyl)zirconium dichloride, bis(4,5,6,7-tetrahydro-1-indenyl)zirconium dichloride, and ethylene-[bis(4,5,6,7-tetrahydro-1-indenyl)] zirconium dichloride.

Most preferably, the metallocene compound is bis-(indenyl)zirconium dichloride. The metallocene compounds utilized within the embodiment of this art can be used as crystalline solids, as solutions in aromatic hydrocarbons. After the reaction is complete, a free-flowing powder is recovered by low temperature evaluation or nitrogen purge.

After solvent removal, the product of the metallocene contact stage is a free flowing powder and may be used a catalyst precursor which is activated with a alkyl aluminum cocatalyst or activator to form a catalyst composition free of aluminoxane. The precursor in combination with a cocatalyst acts as an olefin polymerization catalyst. Alkylaluminum and alkylaluminum halides, including alkylaluminum mono halides and alkylaluminum dihalides, in which the alkyl contains 1 to 10 carbon atoms are cocatalysts for olefin polymerization. Preferably, the cocatalyst is a trialkylaluminum, such as trimethylaluminum, triethylaluminum and triisobutylaluminum. Triisobutylaluminum is most preferred. The amount of cocatalyst in the composition, based on metallocene ranges from 1 to 1000, preferably 1 to 100. Cocatalyst contact with the precursor can be preferably effected in the polymerization reactor or prior to catalyst introduction into the reactor.

All of the foregoing steps are undertaken under anhydrous conditions, in the absence of oxygen.

The efficacy of the resulting composition in olefin polymerization catalysis is surprising. If a product is formed from the reaction of bis(indenyl)zirconium dichloride and trisisobutylaluminum, in the absence of the ion exchange resin, it does not act as a catalyst in ethylene polymerization. Moreover, if a product is formed from the reaction of bis(indenyl)zirconium dichloride, trisisobutylaluminum, and tritylchloride, in the absence of the ion exchange resin, it does not act as a catalyst in ethylene polymerization.

Catalysts of the invention have an activity of at least about 1000–2000 g polymer/g catalyst or about 100–200 kg polymer/g transition metal.

Although the catalysts can be used in the synthesis of any olefin polymers, such as aromatic or linear olefins, e.g., styrene or ethylene, they are preferably used as ethylene/alpha-olefin copolymerization catalysts. Accordingly, for the purposes of illustration, the invention will be described below in conjuction with alpha olefin catalyst synthesis. However, it will be understood by those skilled in the art that the invention is not limited to alpha-olefin polymerization catalyst compositions.

In one embodiment, the catalyst of the invention exhibits high activity for polymerization of ethylene and higher alpha-olefins and allows the synthesis of ethylene polymers and copolymers with a relatively narrow molecular weight distribution and homogeneous branching distribution. The catalyst of the invention exhibits high activity for copolymerization of ethylene and higher alpha-olefins and allows the synthesis of linear low density polyethylene with a relatively narrow molecular weight distribution and homogeneous branching distribution. The molecular weight distribution is determined as MFR $[I_{21}/I_2]$ which is less than 25, preferably the MFR ranges from 18 to 24, and most preferably ranges from 19 to 22, in polymerization products of the invention. Branching distribution in ethylene copolymers is evaluated on the basis of the resin's melting point. Relatively homogeneous branching distribution is one which the melting point ranges from 100° to 120° C., depending on comonomer composition.

Ethylene homopolymers, as well as copolymers of ethylene with one or more $C_3$–$C_{10}$ alpha-olefins, can be produced in accordance with the invention. Thus, copolymers having two monomeric units are possible as well as terpolymers having three monomeric units. Particular examples of such polymers include ethylene/1-butene copolymers, ethylene/1-hexene copolymers, ethylene/4-methyl-1-pentene copolymers, ethylene/propylene/1-hexene terpolymer, EPDM, and DCPD.

Ethylene/1-butene and ethylene/1-hexene copolymers are the most preferred copolymers polymerized in the process of and with the catalyst of this invention. The ethylene copolymers produced in accordance with the present invention preferably contain at least about 60 percent by weight of ethylene units.

Any heretofore known alpha-olefin polymerization processes can be used to polymerize alpha-olefins in the presence of the catalyst compositions of the present invention. Such processes include polymerizations carried out in suspensions, in solution or in the gas phase.

EXAMPLES

All procedures were performed under a dry nitrogen atmosphere. All liquids/solvents were anhydrous.

Example 1

Catalyst Preparation

A 250 mL round bottom flask containing a magnetic stir bar and 100 mL dichloromethane was charged with 5.0 g black Amberlite 124 beads. 7.0 g $Ph_3CCl$ was added, the slurry was stirred at room temperature and the solvent was decanted from the black beads. The beads were slurried in toluene and 400 mg (1.0 mmol) $Ind_2ZrCl_2$ was added followed by 30 minutes of stirring at room temperature. The toluene was removed in vacuo at 50° C. to leave a heterogeneous mixture of black and yellow catalyst.

Example 2

Polymerization

A 1 gallon stainless steel autoclave at room temperature was charged with 1500 mL heptane and 350 mL 1-hexene. 2.9 mL of 14 weight percent tri-iso-butylaluminum in hexane were added as a catalyst activator. The reactor was closed, and the temperature was brought to 70° C. 214.0 mg of catalyst was introduced with ethylene pressure. Ethylene was replenished on demand to keep reactor pressure constant at 145 psi. After 30 minutes, the reactor was vented and cooled to room temperature. 112 gm of copolymer were collected. $I_2$=0.02, MFR=25.0, density=0.905, $T_m$ =115.2° C., mole % $C_6$=2.5.

Thus it is apparent that there has been provided, in accordance with the invention, a composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A composition comprising
   a resin, which is crosslinked, porous, and contains cation ion exchange sites and bis-(indenyl)zirconium dihalide, wherein the bis-(indenyl)zirconium dihalide is present in an amount ranging from 0.01 to 1.0 mmol/g of the composition.

2. The composition of claim 1, wherein the resin contains sulfonate groups.

3. A composition comprising
   a resin which is crosslinked, porous and contains sulfonate exchange sites and $Cp_mMA_nB_p$ in which Cp is an unsubstituted or substituted cyclopentadienyl group, M is zirconium or hafnium and A and B belong to the group including a halogen atom, hydrogen or an alkyl group;
   wherein m is 1 or 2 and m+n+p is equal to the valence of M;

wherein the $Cp_mMA_nB_p$ is present in an amound ranging from 0.01 to 2.0 mmol/g of the composition.

4. A composition comprising a resin containing sites ion exchangeable with $Ph_3C^+$ and bis-(substituted cyclopentadienyl) zirconium dihalide supported thereon;

formed by the steps comprising providing an ion exchange resin containing sulfonate groups in the form of a salt of an alkali or alkali earth metal; displacing the alkali or alkali earth metal to form an intermediate; and contacting the intermediate with $Cp_mMA_nB_p$ temperature ranging from 0° to 100° C., where $Cp_mMA_nB_p$ is present in amount ranging from 0.01 to 2.0 mmol/g composition.

5. A catalyst for producing polyethylene comprising an alkylaluminum compound, in which the alkyl contains 1 to 10 carbon atoms and wherein the alkylaluminum compound is selected from the group consisting of alkylaluminum mono halides, alkylaluminum dihalides, and trialkylaluminum in combination with the composition of claim 1.

6. The catalyst of claim 5 wherein the trialkylaluminum is selected from the group consisting of trimethylaluminum, triethylaluminum and triisobutylaluminum.

7. The catalyst of claim 5 wherein the trialkylaluminum is triisobutylaluminum.

8. A catalyst for producing polyethylene comprising an alkylaluminum compound, in which the alkyl contains 1 to 10 carbon atoms and wherein the alkylaluminum compound is selected from the group consisting of alkylaluminum mono halides, alkylaluminum dihalides, and trialkylaluminum in combination with the composition of claim 2.

9. The catalyst of claim 8 wherein the trialkylaluminum is selected from the group consisting of trimethylaluminum, triethylaluminum and triisobutylaluminum.

10. The catalyst of claim 8 wherein the trialkylaluminum is triisobutylaluminum.

11. A catalyst for producing polyethylene comprising an alkylaluminum compound, in which the alkyl contains 1 to 10 carbon atoms and wherein the alkylaluminum compound is selected from the group consisting of alkylaluminum mono halides, alkylaluminum dihalides, and trialkylaluminum in combination with the composition of claim 3.

12. The catalyst of claim 11 wherein the trialkylaluminum is selected from the group consisting of trimethylaluminum, triethylaluminum and triisobutylaluminum.

13. The catalyst of claim 11 wherein the trialkylaluminum is triisobutylaluminum.

14. A catalyst for producing polyethylene comprising an alkylaluminum compound, in which the alkyl contains 1 to 10 carbon atoms and wherein the alkylaluminum compound is selected from the group consisting of alkylaluminum mono halides, alkylaluminum dihalides, and trialkylaluminum in combination with the composition of claim 4.

15. The catalyst of claim 14 wherein the trialkylaluminum is selected from the group consisting of trimethylaluminum, triethylaluminum and triisobutylaluminum.

16. The catalyst of claim 15 wherein the trialkylaluminum is triisobutylaluminum.

17. The composition of claim 1, wherein the $Cp_mMA_nB_p$ comprises 0.01 to 2.0 mmol/g of the composition.

18. The composition of claim 5, wherein the $Cp_mMA_nB_p$ comprises 0.01 to 2.0 mmol/g of the composition.

19. The composition of claim 1, wherein the resin is in the form of porous particles.

20. The composition of claim 17, wherein the resin is in the form of porous particles.

21. The composition of claim 18, wherein the resin is in the form of porous particles.

* * * * *

UNITED STATES PATENT AND TRADEMARK OFFICE
CERTIFICATE OF CORRECTION

PATENT NO. : 5,455,214
DATED : October 3, 1995
INVENTOR(S) : Allan B. Furtek et al.

It is certified that error appears in the above-indentified patent and that said Letters Patent is hereby corrected as shown below:

Col. 7, line 2, Claim 3, "amound" should read --amount--.

Col. 7, line 13, Claim 4, after $Cp_mMA_nB_p$, insert --at a--.

Signed and Sealed this

Sixteenth Day of January, 1996

Attest:

BRUCE LEHMAN

*Attesting Officer*  Commissioner of Patents and Trademarks